F. W. BACON.
Steamer for Culinary Purposes.
No. 57,244.  Patented Aug. 14, 1866.
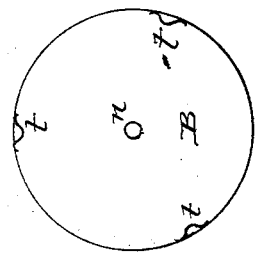
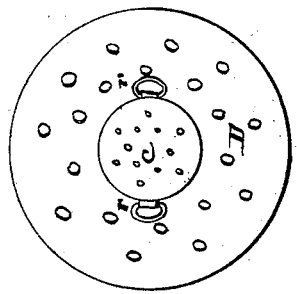
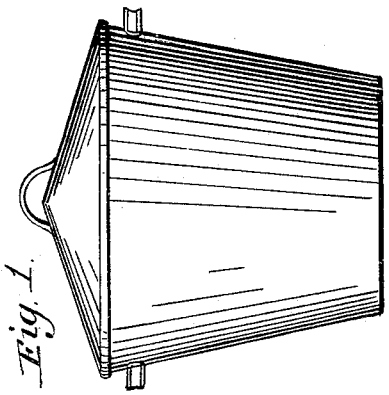
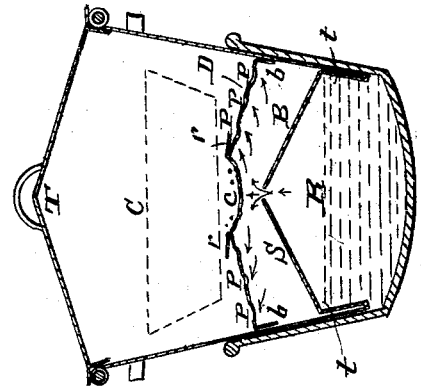
Witnesses:  Inventor:

UNITED STATES PATENT OFFICE.

FRED W. BACON, OF WASHINGTON, DISTRICT OF COLUMBIA, ASSIGNOR TO HIMSELF AND D. A. STRONG, OF SAME PLACE.

CULINARY STEAMER FOR BOILERS.

Specification forming part of Letters Patent No. 57,244, dated August 14, 1866.

*To all whom it may concern:*

Be it known that I, FRED WALTON BACON, of the city and county of Washington, in the District of Columbia, have invented a new and useful Improvement in Steamers for Culinary Purposes; and I do hereby declare that the following is a full and exact description thereof, reference being had to the accompanying drawings, and to the letters of reference marked thereon.

The nature of my invention consists in constructing a steamer with a chamber and a deflector for extracting a portion of the water rising with the steam and diffusing the dry steam equally and uniformly among the articles to be cooked, thus preventing them from becoming water-soaked while being cooked by steam.

The steamer is made of tin or other suitable material, and a common cooking-pot, kettle, or other vessel for heating water may be used to receive the steamer proper.

Figure 1 is a side view of my improved steamer. Fig. 2 is a bottom view. Fig. 3 is a vertical section through the center. Fig. 4 is a perforated conical diaphragm with a concave center, also perforated except in exact center.

Fig. 1 shows the cooking-steamer proper. Fig. 2 is a bottom view, showing the conical bottom B with the spring $h$, through which the steam passes, and also showing the tubes $t\ t\ t$, through which the water accumulating in the steam-chamber above may escape. Fig. 3 is a vertical section of the center of the steamer, and also of the vessel used for generating the steam to be used.

Steam is generated in the reservoir R, and passes rapidly through the opening $h$, striking the deflector $c$, which, having no holes in the exact center, causes the water to collect from the steam and flow down the under surface of the conical diaphragm D, and to settle through the tubes $t\ t\ t$ into the reservoir R. The dry or refined steam at the same time spreads throughout the steam-chamber S, and passing through the perforations in the diaphragm D, and also through the smaller perforations in the deflector $c$, enters the cooking-chamber C, chamber C being provided with a cover at top T.

The small tubes $t\ t\ t$ extend to the bottom edge of the steamer under the surface of the water, in order that the water distilled from the steam may pass off without allowing any volume of steam to generate from the tubes $t\ t\ t$.

The concavity $c$ also forms a level, on which a pan or other vessel may be placed containing the articles to be cooked or heated.

The diaphragm, Fig. 4, is made to detach from the steamer proper, in order to facilitate cleaning. The rings $r\ r$ are used for lifting. A band is attached to and around the under edge of the diaphragm, as shown at $b\ b$, Fig. 3.

I do not claim, broadly, the construction of a steamer to be placed in a kettle or other vessel for the purpose of cooking by steam; but I consider the above-described invention an improvement over other steamers for culinary purposes heretofore known; and I do therefore claim as my invention and desire to secure by Letters Patent—

The construction of steamers for culinary purposes provided with the perforated diaphragm D or its equivalent, the concave center $c$ or its equivalent, and the conical bottom B, with the tubes $t\ t\ t$ or their equivalents, made substantially in the manner and for the purposes set forth.

FRED WALTON BACON.

Witnesses:
S. G. CLAYTON,
H. McDOUAL.